United States Patent [19]
Baker et al.

[11] Patent Number: 5,381,545
[45] Date of Patent: Jan. 10, 1995

[54] DATA BACKUP AND RECOVERY IN A DATA PROCESSING SYSTEM

[75] Inventors: Stephen M. Baker, Southampton; Peter J. Lupton, Eastleigh, both of England

[73] Assignee: International Business Machines Corporation, Armonk, N.Y.

[21] Appl. No.: 890,495

[22] Filed: May 28, 1992

[30] Foreign Application Priority Data

Jun. 4, 1991 [EP] European Pat. Off. ............ 91305043

[51] Int. Cl.$^6$ ............................................. G06F 11/20
[52] U.S. Cl. ...................................... 395/575; 395/600; 364/268.2; 364/282.1
[58] Field of Search ................ 395/575, 600; 364/268.2, 282.1, 283.4, 920, 944.1, 945.3, 962.1

[56] References Cited

U.S. PATENT DOCUMENTS 4,686,620 8/1987 Ng ........................................ 364/200
4,751,702 6/1988 Beier et al. ........................... 371/9.1

FOREIGN PATENT DOCUMENTS 295424 5/1988 European Pat. Off. .
336546 10/1989 European Pat. Off. .

OTHER PUBLICATIONS

*Data Recovery in IBM Database 2* by R. A. Crus, IBM Systems Journal, vol. 23, #2, 1984.
*Incremental Data Base Log Image Copy* by R. A. Crus et al., IBMTDB vol. 25, #7B, Dec. 1982.
*Checkpoint Copy of Active/Interactive Data with Impercise Checkpoint Time* by N. K. Ouchi, IBMTDB vol. 26 #3A, Aug. 1983.

*Primary Examiner*—Vincent P. Canney
*Attorney, Agent, or Firm*—Lawrence D. Cutter

[57] ABSTRACT

A data processing system for managing stored data is described. A log recording incremental updates to the data is provided for data recovery purposes in the event of a system failure. A backup copy of at least a portion of the stored data can be made without closing that portion for update. Any in-progress modifications at the time the backup is taken are allowed for by calculating a recovery point before the time of the backup, from which point recovery is to be performed using the recovery log. The recovery point depends at least in part on the start time of the oldest in-progress data file update.

16 Claims, 8 Drawing Sheets

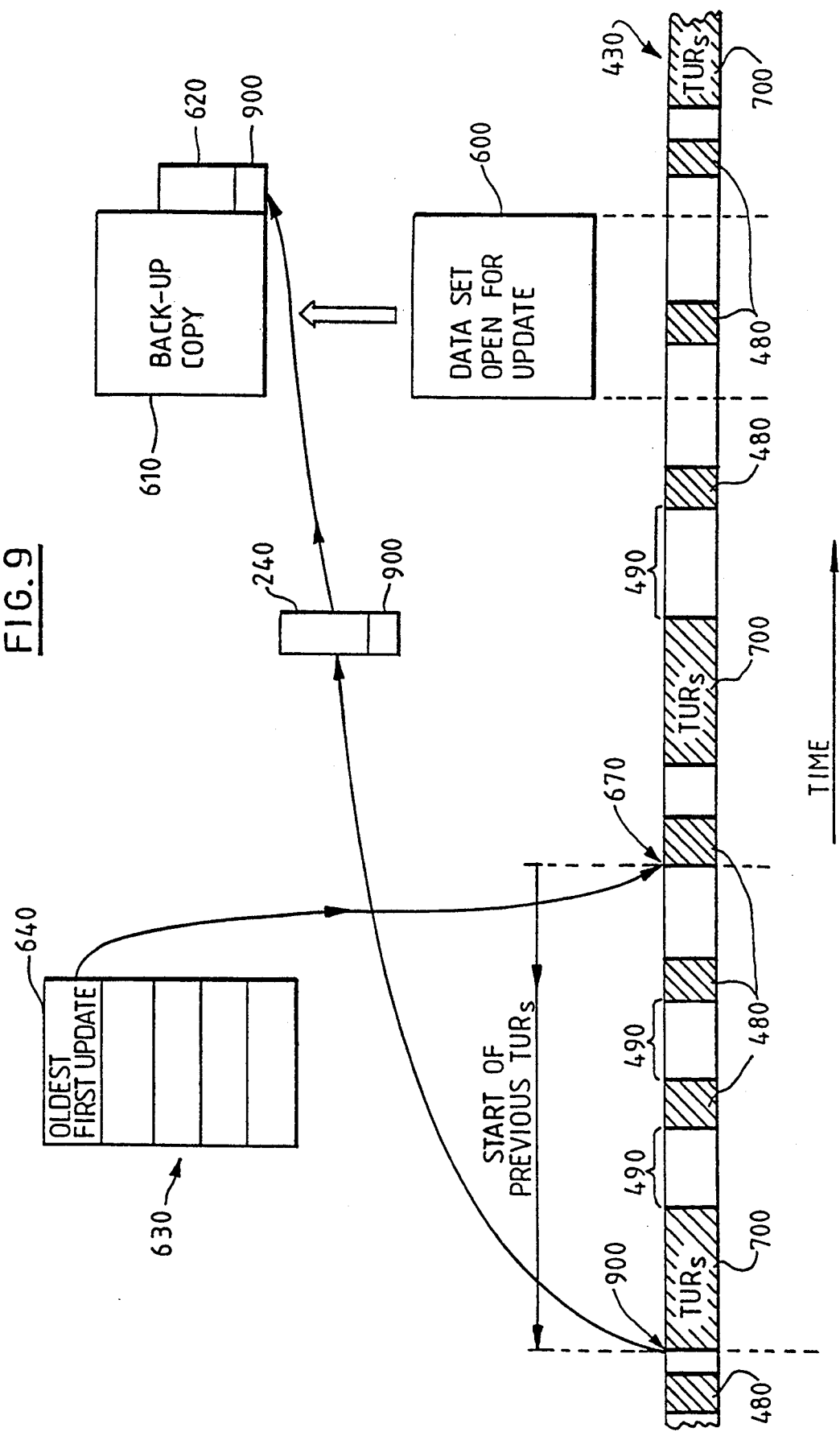

DATA BACKUP AND RECOVERY IN A DATA PROCESSING SYSTEM

The present invention relates to the backup and subsequent recovery of data in a data processing system.

In a database system it is important that the data structure and content can be rebuilt in the event of a system failure. For this reason, there is usually provided a means for taking a backup copy of part or all of the database. If it is required to recover from a major system failure the data stored in the backup copy can be reinstated in the database.

In general the use of a single backup copy is not sufficient, however frequently such a copy is made. This is particularly true in databases linked to transaction processing systems, where changes or updates to the data are made frequently. In these situations a recovery log is kept. The log provides a record of each incremental change made to the database since the last complete backup was taken. When recovery is required, the data stored in the backup copy are reinstated into the database and the updates stored in the recovery log are applied sequentially to this data.

A problem discussed in the article "Incremental Data Base Log Image Copy" (IBM Technical Disclosure Bulletin Vol 25, No. 7B, page 3730, December 1982) is that a balance must be struck between the processing overhead required to take a complete backup copy of the database, and the processing time taken to rebuild the data from the recovery log in the case of a catastrophic failure. During this rebuilding time, which clearly depends on the frequency with which backup copies are made, the system would be out of action. The solution offered in the above article is to make frequent copies of small portions of the database.

In transaction management systems such as the IBM CICS/ESA system (IBM and CICS/ESA are trademarks of the International Business Machines Corporation) a "data set" can be logically addressed by a number of alias data filenames. The data set must be "open" if an application program requires update access to any of the data files denoted by these filenames. When a data set is open in this prior art system, a backup copy of that data set cannot be made because at any particular time there may be a large number of part-completed updates in progress. In other words a self-consistent state of the data set cannot be identified.

The use of worldwide networks of data processors managing data structures means that an individual data set may be required for update at any time of the day. It is preferable therefore to keep the data set open continuously for as long a period as possible, perhaps spanning many days or weeks. However, in the prior art systems described above this would mean that backup copies could be made only infrequently, and recovery in the case of a catastrophic failure would require all of the incremental updates stored in the recovery log over a potentially long period of time to be applied. The recovery log would also be large and cumbersome.

In EP-336546-A a forward recovery log to allow recovery in the case of a catastrophic failure is described, along with means for identifying and preventing subsequent access to data files containing errors caused by the system failure.

In EP-295424-A a system is disclosed for designating modified data pages as "dirty pages", in order to minimise the processing overhead of recovery from a catastrophic failure.

WO-8601018-A discloses a two phase scan of storage to be backed up. In the first scan updates are allowed while a complete backup copy is made. During the second scan the storage to be backed up is closed (that is, updates are not allowed) in order that any updates which occurred during the first scan can be added to the backup copy. This system does not provide continuous data file availability.

The article "Checkpoint Copy of Active/Interactive Data with Imprecise Checkpoint Time" (IBM Technical Disclosure Bulletin Vol 26, No. 3A, page 1291, August 1983) describes a backup method consisting of making multiple copies of data sets and switching logs after a copy has been made. Recovery of the data set would consist of restoring the copy that had completed before an update was made and all log activity would be applied from the time of the previous backup. This method does provide continuous data set availability, but at the expense of the processing overheads of making the multiple copies and switching logs after a copy has occurred.

There is a need for a convenient method for allowing continuous availability of data sets without incurring the problems described above.

Accordingly the present invention provides data processing apparatus comprising: means for processing stored data as a series of logical units of work (LUWs), with updates to the stored data made during each LUW being committed at a commit point for that LUW; means for maintaining a log of updates made to the stored data; means for detecting the oldest uncommitted update made to the stored data; means responsive to the detecting means for calculating a recovery point; means for taking a backup copy of at least a portion of the stored data while that portion is available for update; and means for recovering the database by reinstating the backup copy and applying the updates contained in any log entries made after said recovery point.

Viewed from a second aspect the invention provides a method of operation of a data processor, comprising the steps of: processing stored data as a series of logical units of work (LUWs), with updates to the stored data made during each LUW being committed at a commit point for that LUW; maintaining a log of updates made to the stored data; detecting the oldest uncommitted update made to the stored data: calculating a recovery point dependent upon the start time of the oldest uncommitted update; taking a backup copy of at least a portion of the stored data while that portion is available for update; and when necessary, recovering the database by reinstating the backup copy and applying the updates contained in any log entries made after said recovery point.

The present invention further provides a transaction management system having means for processing stored data as a series of logical units of work (LUWs), with updates to the stored data made during each LUW being committed at a commit point for that LUW; means for maintaining a log of updates made to the stored data; means for detecting the oldest uncommitted update made to the stored data; means responsive to the detecting means for calculating a recovery point; means for taking a backup copy of at least a portion of the stored data while that portion is available for update; and means for recovering the database by reinstating the backup copy and applying the updates contained in any log entries made after said recovery point.

viewed from a fourth aspect the present invention provides a transaction manager, for cooperating with a data processing apparatus, to provide means for processing stored data as a series of logical units of work (LUWs), with updates to the stored data made during each LUW being committed at a commit point for that LUW; maintaining a log of updates made to the stored data; detecting the oldest uncommitted update made to the stored data; calculating a recovery point dependent upon the start time of the oldest uncommitted update; taking a backup copy of at least a portion of the stored data while that portion is available for update; and when necessary, recovering the database by reinstating the backup copy and applying the updates contained in any log entries made after said recovery point.

Viewed from a fifth aspect the invention provides apparatus cooperable with data processing apparatus to provide means for processing stored data as a series of logical units of work (LUWs), with updates to the stored data made during each LUW being committed at a commit point for that LUW; maintaining a log of updates made to the stored data; detecting the oldest uncommitted update made to the stored data; calculating a recovery point dependent upon the start time of the oldest uncommitted update; taking a backup copy of at least a portion of the stored data while that portion is available for update; and when necessary, recovering the database by reinstating the backup copy and applying the updates contained in any log entries made after said recovery point.

In its various aspects the invention addresses the previously conflicting needs of providing continuous data availability, providing a backup mechanism which preserves data integrity following a system failure, and minimising the processing overhead caused by such a mechanism.

A backup copy of at least a portion of the stored data can be made without closing that portion for update. Any committed modifications can be guaranteed to be in the backup copy, and any in-progress modifications at the time the backup is taken are allowed for by calculating a recovery point which is generally before the time of the backup, from which point recovery is to be performed using the recovery log. The recovery point depends at least in part on the start time of the oldest in-progress data file update.

The recovery point can be recalculated from time to time, and, subject to other uses of the log, log entries made before the recovery point corresponding to a backup copy can be discarded.

Because there is no need to prevent update access to the portion of the stored data to be backed up, back-up copies can be made at will.

In a simple embodiment, the calculation of the recovery point merely involves setting the recovery point to equal the time of the oldest uncommitted update, and may be performed at the time the backup copy associated with that recovery point was made. However, more refined preferred embodiments are described below.

The oldest uncommitted update can be detected by, for example, detecting the start time of each LUW in progress or detecting the earliest time at which a non-completed LUW made an update. However, it is preferably detected by detecting the first log entry, corresponding to an update, made by each LUW; storing the time of that first log entry; detecting the earliest of at least a subset of the stored first log entry times; and deleting the first log entry time corresponding to a completed LUW. Detecting in this way firstly provides an up-to-date collection of first log entry times which can be scanned whenever necessary to determine the earliest first log entry time, and secondly provides a result which, because it relates to a particular log entry, is easily used to locate a position in the log for recovery purposes.

Some LUWs may not make any entries corresponding to file updates. These LUWs will simply be ignored by the above preferred procedure.

The invention is particularly, though not exclusively, applicable to a system in which the stored data is organised as a plurality of data sets, each data set being addressable by means of one or more alias filenames. In such a system a catalogue, for storing system housekeeping data associated with each data set, provides a useful means for storing the recovery point corresponding to that data set. A consequence of this is that the recovery point can be calculated whenever convenient (preferably periodically), and written to the catalogue. At backup time the backup copy of the data set can then include a copy of the data set's catalogue at the time the backup was taken, and therefore includes the most recently calculated recovery point at the time the backup was taken. Similarly, if recovery is necessary the backup copy of the data set is reinstated along with its catalogue, and the recovery point appropriate to that backup copy and from which point incremental updates stored in the log should be reapplied, can be obtained from the recovered catalogue.

The distinction between data bases and data sets is often blurred. Accordingly, the use herein of the term "data set" should not be taken to exclude similar data structures known by other terms.

It is preferred that there is associated with each data set a data item or 'flag' signifying whether that data set is eligible to be backed up while available for update. This flag can be used to signal to other parts of the system such as a recovery utility or a backup utility that any normal rules preventing backup or other operations being performed on an open data set should be overridden. In the case where recovery points appropriate to such eligible data sets are calculated periodically, the flag can be used to prevent this calculation taking place for non-eligible data sets to reduce processing overhead.

When a new filename is associated with a data set, it is preferred that a tie-up-record (TUR) is written to the log, the TUR defining at least the association between the filename and the data set. At recovery time when log entries are being reapplied, a TUR is thus encountered in the log before any update entries which might refer to the filename defined in that TUR.

To save the recovery utility from having to work through the log from the time the first TUR was written (which might be some considerable time before the time of failure), it is preferred that a set of TURs, corresponding to at least some of the data sets, should be written periodically to the log. The TURs for all open data sets which are eligible to be backed up while open could be included in this set. This means that at any time only a relatively small section of the log has to be scanned to find all of the TURs relevant at that time.

Therefore it is preferred that the recovery point is defined as the start time of writing a previous set of TURs for which writing completed before the oldest uncommitted update was made. In other words, the section of the log which has to be reapplied at the time of recovery then includes all relevant TURs and all entries relating to updates which were uncommitted at the time the recovery point was calculated. Using a recovery point as calculated above ensures that all updates which could possibly have been uncommitted at the time the backup was taken are included in this part of the log. A convenient time for calculating a recovery point is when a set of TURs has been written to the log. However, any other suitable time could be used, such as the time the backup copy to which that recovery point relates is taken. If the recovery point is calculated at a time other than backup time, it can simply be stored in the data set's catalogue. This stored recovery time can then be updated whenever a revised value is calculated, the most recently calculated value being backed up along with the data set.

Although calculating the recovery point at the time the backup is taken would work, it is preferable to keep the backup processing separate from the calculation of the recovery point. This is because the backup copying will probably be an operating system task (the operating system not necessarily having any knowledge of which LUWs are in progress at a particular time), whereas the calculation of the backup point will be a database or transaction manager task.

In order that the invention may be fully understood a preferred embodiment thereof will now be described, by way of example only, with reference to the accompanying drawings in which:

FIG. 9 shows the backup of a data set in which the TURs are used in calculating the recovery point.

Figure 1:
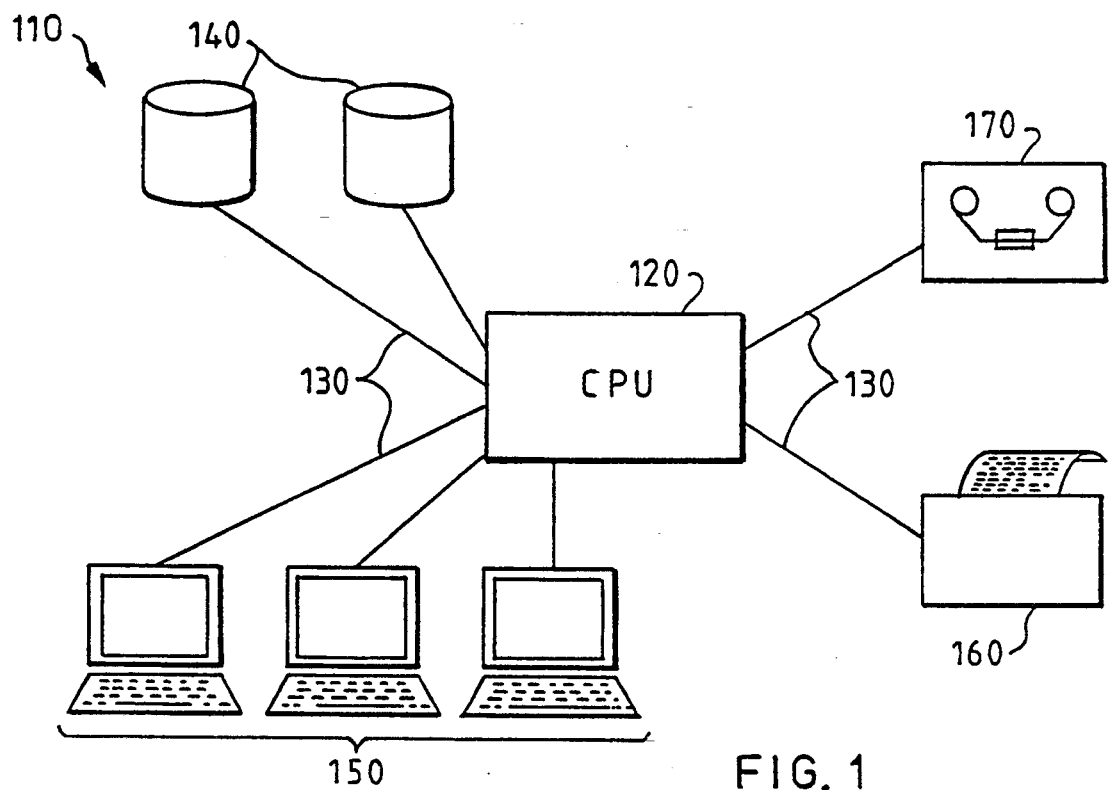
FIG. 1 shows a typical data processor for managing a data structure.

Referring now to FIG. 1, one example of a data processing system 110 for managing stored data is shown. The system comprises a central processing unit (CPU) 120 which is logically and electrically connected via links 130 to a number of peripheral devices such as disk storage 140, data entry terminals (such as VDUs, EFT-POS terminals etc) 150, a printer 160 and tape storage 170.

Data is stored in an organised manner on, for example, disk storage 140. In a transaction oriented system, updates to the data stored in this way may be initiated in one of several ways such as by user input via a terminal 150, by a system housekeeping task, or by a batch job set up in advance. In a commercial system, it is normal for data to be updated in this manner very frequently.

The data processor shown in FIG. 1 may be linked via an electronic network to other data processors, and in fact may have access to data stored at remote locations.

Figure 2:
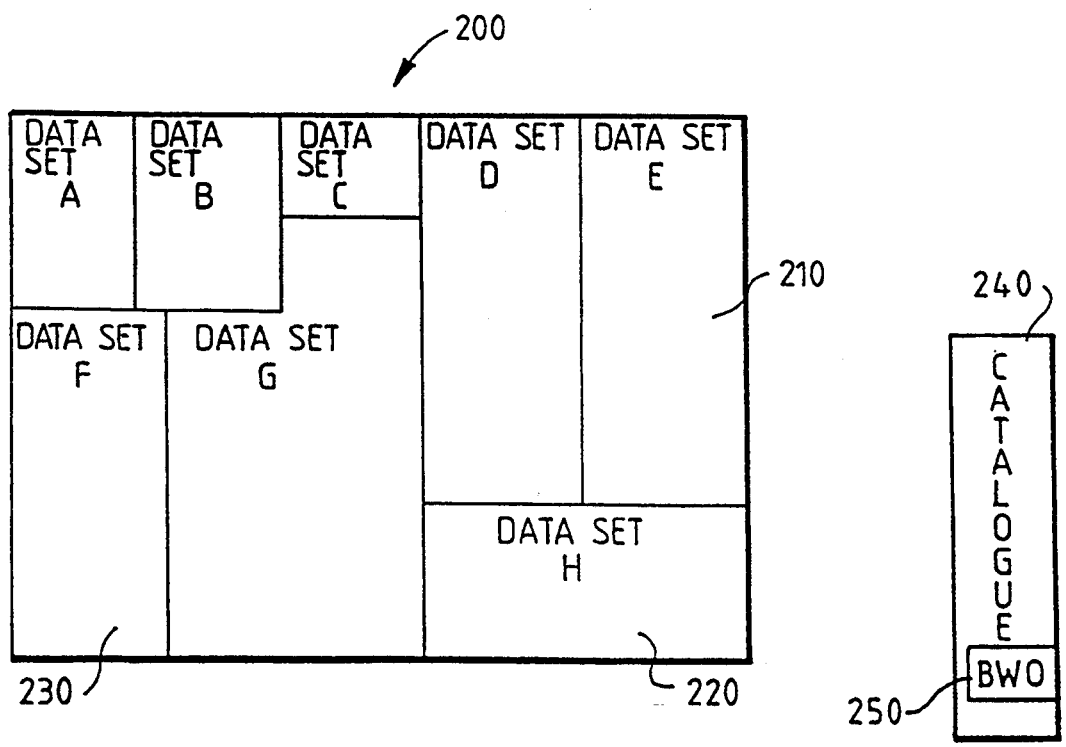
FIG. 2 shows the logical division of an area of storage into data sets

FIG. 2 shows how data may be arranged in storage 140. An area of storage 200 logically contains a number of data sets 210, 220, 230. The raw storage itself is managed by the operating system of the data processor, while the upkeep of the data set structure and of the data itself is performed by a database or transaction management program running under the operating system. A catalogue 240 containing operating system housekeeping information is associated with each data set. Data sets are typically addressed from within application programs running under the transaction manager by logical, or alias, filenames.

In this embodiment the catalogue also contains a 'flag', the 'BWO' flag 250, which can be set under control of the transaction management program to indicate whether backups of the data set can be taken while the data set is open for update. The purpose of this feature will be described in more detail below.

Figure 3:
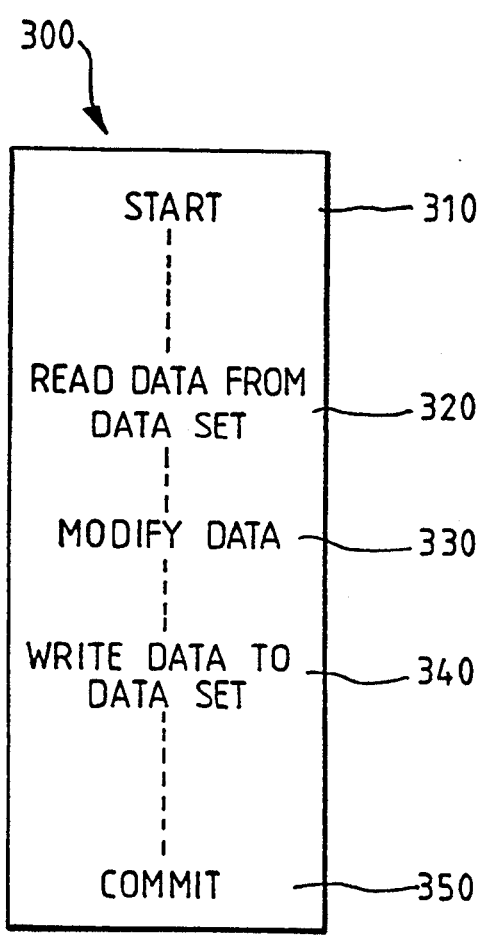
FIG. 3 shows a data update performed by a single Logical Unit of Work (LUW)

Updates to one or more data sets are divided up into logical units of work (LUWs). A simplified schematic representation of a single LUW 300 is shown in FIG. 3. This LUW 300 comprises five main steps: the start of the LUW 310; the step of reading data from one or more data sets 320; the step of modifying that data in some way 330; the step of writing the data back out to the data set(s) 340; and the commit point 350.

Updates may be made throughout the LUW, but are only committed to storage at a single commit point or synchronisation point. This commit point 350 will be at the end of the LUW. The situation is complicated, however, by the fact that when an update to the database is made during the LUW, the question of whether the update is committed can depend on other resource managers indicating that they are in a position to commit any concurrent updates from the same LUW made to those other resources. If another resource is not in a position to commit, the LUW is aborted and all of the updates corresponding to that LUW are backed out, or undone. If the commit point is successfully reached, all of the updates corresponding to that LUW are committed.

Figure 4:
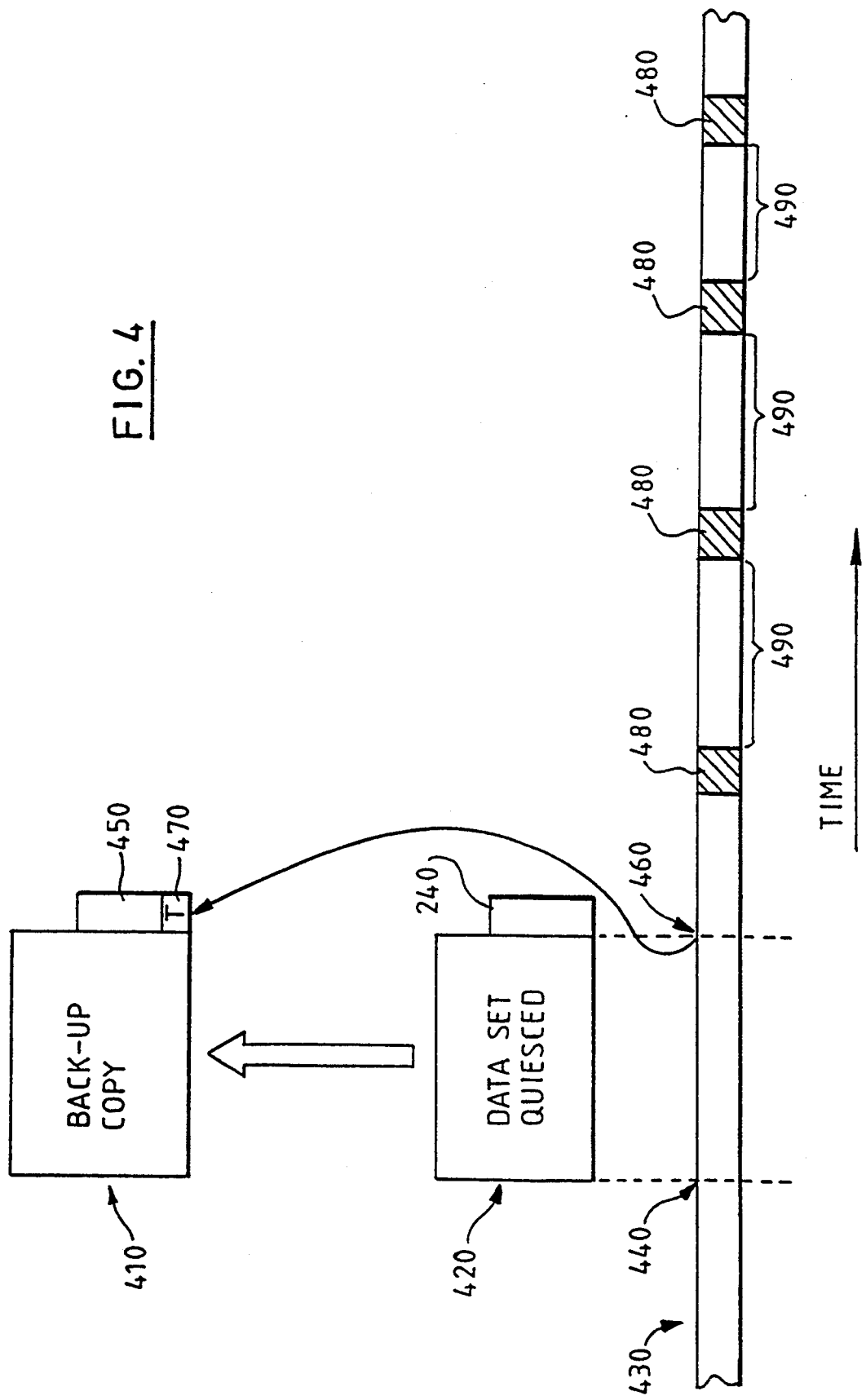
FIG. 4 shows the prior art backup of a data set while that data set is quiesced.

In a commercial system the data being stored and updated may have a very great business value. For example, the data may relate to financial transactions or to product orders. It is therefore important that the data is not lost if a catastrophic processing system failure or an operator error causes the primary (working) copy of the data set to be destroyed. FIG. 4 illustrates a prior art scheme providing a mechanism for rebuilding a data set in the event of such a failure.

The scheme in FIG. 4 relies on the use of a backup copy 410 of the data set 420 made at a particular time, together with a recovery log 430 in which details of all updates made to the data set 420 since the backup 410 was taken are recorded. The basic procedure is to close access to the data set at time 440, allowing or forcing all LUWs relating to that data set which are still in progress to reach a commit point. The data set is then in a self-consistent state, with no doubt that all updates initiated by time 440 have been committed to storage. A backup copy of the data set is then made. A considerable time may be required to backup a large data set, particularly in a multi-tasking environment where backup copying may not be the highest priority job. A backup copy 450 of the catalogue 240 associated with the data set may also be made.

The data set is re-opened for update access when the backup copy is complete at time 460. This time may be recorded as part of the catalogue data 470.

Whenever an LUW initiates an update to data set 420 after the backup has completed, an entry 480 giving details of that update is made in the recovery log 430. Should the primary copy of the data set be lost for any reason, it may be rebuilt to its state at the time of loss by re-copying the backup copy back to provide a new working copy, obtaining the backup time 460 from the time 470 saved in the backed-up copy 450 of the catalogue, and then applying all relevant updates stored in the recovery log after time 460. It should be noted that time 460 may in fact correspond to the start of the log in some cases. Also, some adjustment has to be made in relation to uncommitted LUWs in progress at the time of failure; however, there are established backing out techniques for coping with this which will not be described here.

other log entries may be written, which are shown only as blank areas 490 on FIG. 4. These areas represent entries which are unconnected with forward recovery, and may include for example system synchronisation or startup information, or entries associated with temporary data storage.

Figure 5:
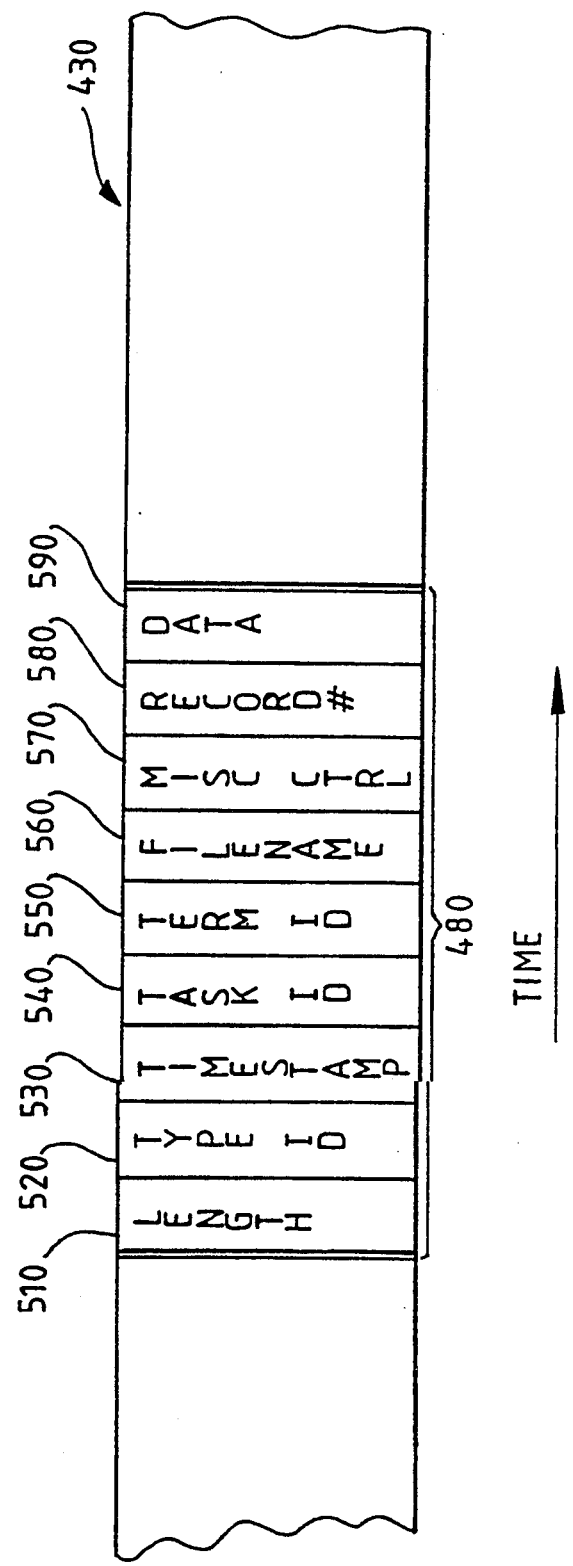
FIG. 5 shows a typical entry on a forward recovery log.

FIG. 5 shows a single entry 480 in the recovery log 430. The entry contains a number of items of information 510–590 relating to a single update to a single file. The information stored in entry 480 is as follows:

510: The length of the log entry, in bytes;
520: An identification of the type of log entry (e.g. add, delete, modify etc);
530: A timestamp, showing the system date and time at which the log entry was made;
540: An identification of the task or job which caused the log entry to be made;
550: The user terminal (if any) associated with the task;
560: The name of the data file to which this entry relates;
570: Miscellaneous control and padding bytes;
580: The record number or address offset, in the file designated by filename 560, to be acted upon; and
590: The data to be written to the file (if applicable).

When the file action is carried out, the transaction manager consults an internal, dynamically maintained, mapping table to determine which data set corresponds to the specified filename.

The backup scheme shown in FIGS. 4 and 5 provides assurance that no updates were 'missed' while the backup copy was being made, but has the disadvantage that the data set must be closed while the backup copy is actually made. This closure can be very inconvenient if the data set is required to be available for 24 hours a day. However, the simple alternative of taking backup copies infrequently and relying on the ability to rebuild the data set from the last backup taken and the recovery log has the disadvantage that, should a failure occur, recovery could take a substantial amount of time. Also, the sheer volume of information which would have to be stored in the log would make the log very large and cumbersome.

Figure 6:
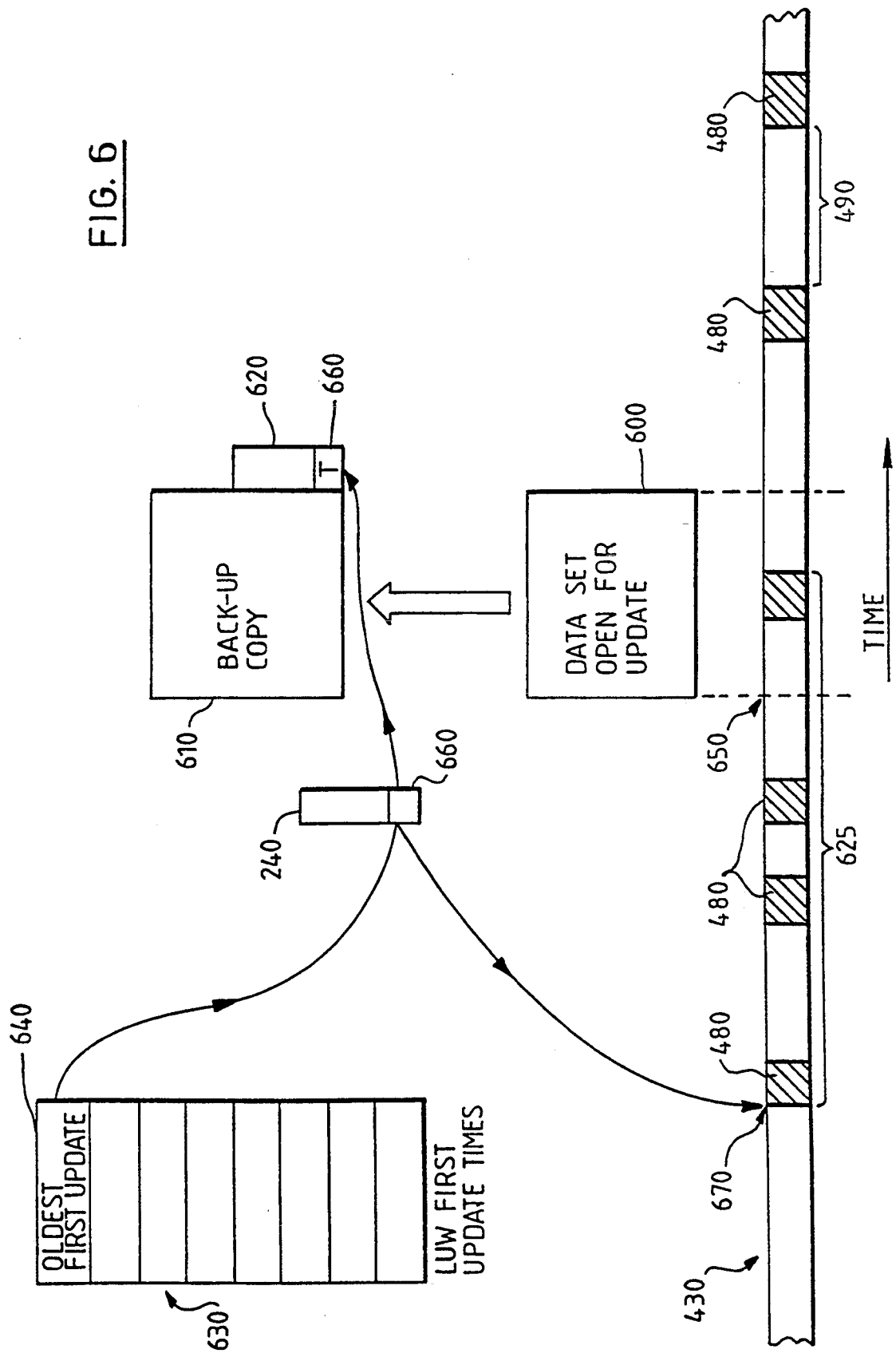
FIG. 6 shows backup of a data set according to the invention.

Referring now to FIG. 6, one embodiment of a backup scheme according to the invention is shown. As above, a recovery log 430 is used to store entries 480, each of which contains information allowing a single file update to be reapplied after a system failure.

In FIG. 6 a backup copy 610 of the data set 600 is made without closing that data set—that is, while still allowing update access to the data set. It may be that the utility program used to take this backup would normally forbid an open data set to be backed up; in these cases the 'BWO' flag 250 in the data set's catalogue 240 can be used to signal to the utility that this general rule should be overridden.

A backup copy 620 of the data set's catalogue 240 is also made. However, because the data set is not closed while being backed up, there could be any number of LUWs making uncommitted updates 625 either before or during the backup procedure. If recovery were then to take place using only those log entries made after the backup had completed (as in FIG. 4), there may be data integrity problems associated with updates made at around the time of the backup. For example, if an update involved moving a data item from the beginning to the end of the data set, that item might be backed up twice as the backup copying proceeds through the data set. Similarly, a data item moved from the end to the beginning might be missed altogether if the target area was backed up before, and the source area after, the update. Furthermore, an update made before the start of the backup but aborted during the backup may also result in missing or duplicated data in the backup copy.

It has been demonstrated above that if a backup copy is made while the data set is open for update, recovery cannot be performed using only those log entries made after the backup has completed, without sacrificing data integrity. However, an earlier position in the log (the 'recovery point') can be defined, from which position, or time, recovery can reliably take place.

A record 630 is kept of the time at which the first log entry corresponding to a file update is made for each LUW. This record is held in a block of storage which is allocated to the LUW when that LUW first writes an update entry to the recovery log, and deleted when that LUW completes (that is, when the LUW commits or aborts). From these records the time 640 of the oldest uncommitted update for the LUWs in progress at any time can be determined.

The time at which the LUW started logging updates is recorded so that all updates made by an LUW can be identified. These updates are committed on an LUW basis, so during subsequent data recovery all updates made for each LUW to be recovered would need to be used. Although the time at which the LUW first made an update, or at which the LUW started, could be recorded, these alternatives are less advantageous than the preferred method. In the former case the time recorded would be difficult to map onto a definite position on the log, and in the latter case this would mean that irrelevant LUWs (those not relating to file update) would be included in the processing to be described below.

In the present case the start of the oldest uncommitted update for the LUWs in progress is determined either at the start 650 of the backup or periodically. This time 660 (the recovery point) is stored in the data set catalogue 240, which is backed up 620 at the same time as the data set. If recovery is required, time 660 is also recovered and is converted to a corresponding position 670 on the log 430. Recovery can then be performed by reinstating the backup copy 610 of the data set to provide a working copy, and then applying the updates represented by log entries made after time 660 (that is, after position 670 on the log).

Because time 660 represents the start time of the oldest in-progress, or uncommitted, update at the time the backup copy was taken, it is known that any update started before time 660 had reached a commit point before the start of the backup at time 650. Therefore, in this embodiment, the log before the recovery point 670 is no longer relevant for recovery purposes and can be discarded.

Because it is usual for data sets to be denoted by long 'names' or storage addresses, much shorter logical filenames are used in log entries to refer to data sets. This is done to save having to write the full data set name to the log in every entry. A possible problem can therefore arise in the case where multiple LUWs make updates to multiple data sets. In such a case, if recovery were to start from recovery point 670, the recovery program or utility would not know which filenames corresponded to which data sets. To address this problem further refinements of the present embodiment will now be described.

Whenever a file is opened for update, a log entry called a Tie-Up Record (TUR) is written to the recovery log. The TUR provides a complete specification of the association between the new filename and the corresponding data set, and also of any intermediate alias names used. Opening a data set for update and writing a TUR will be referred to as creating a filename/data set association in the description below.

Figure 7:
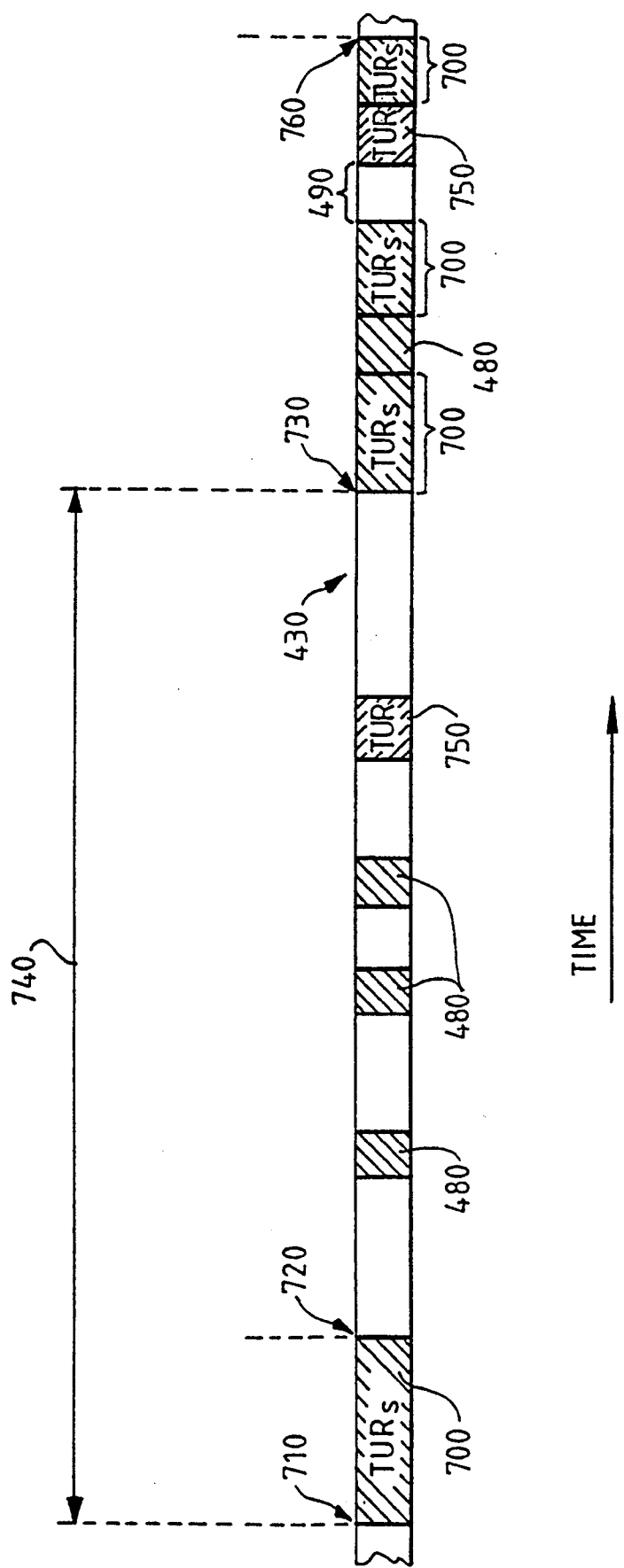
FIG. 7 shows a number of sets of Tie-Up Records (TURs) written to the log file.

Referring to FIG. 7, the basis of the refinements to the embodiment is that a complete set of Tie-Up Records (TURs) 700 is written to the log from time to time. The TURs can be written to the log as part of a convenient periodic system task, or as a specific background job running on the data processor. In order to reduce the processing overhead associated with the TUR writing, a minimum time 740 between the start of each set of TURs on the log can be set at, say, half an hour.

The complete set of TURs comprises a TUR for each filename associated with every open data set which is eligible to be backed up while open, and is written to the log between times 710 and 720. Whether a data set is eligible can be detected by examining the 'BWO' flag 250 in the data set's catalogue as described above. However, if the 'BWO' flag 250 were not implemented, a default approach could be used in which all data sets were considered eligible. Again, this selection of which TURs should be included in the complete set is performed to reduce the processing overheads involved in writing the set.

If a new filename/data set association is created between times 720 and 730 (that is, between the end of one set of TURs and the start of the next) then a single TUR 750 corresponding to that association is written to the log.

Because no data sets need be closed for the complete set of TURs 700 to be written, it is very likely that the set 700 will be interspersed with normal log entries 480 relating to simple file updates, with other log entries 490 unconnected with data recovery, or even with individual TURs 750 relating to new filename/data set associations initiated during the writing of set 700. These new TURs, created after the members of the TUR set have been determined, would not be included in the TUR set. However, they can still be written to the log at the same time as the TUR set because TUR set processing and data set opening can happen independently and TUR writing is asynchronous. In the figure, the set of TURs for which writing starts at time 730 are completed by time 760. The start 710, 730 and end 720, 760 times of the TUR writing are retained for subsequent reference.

Figure 8:
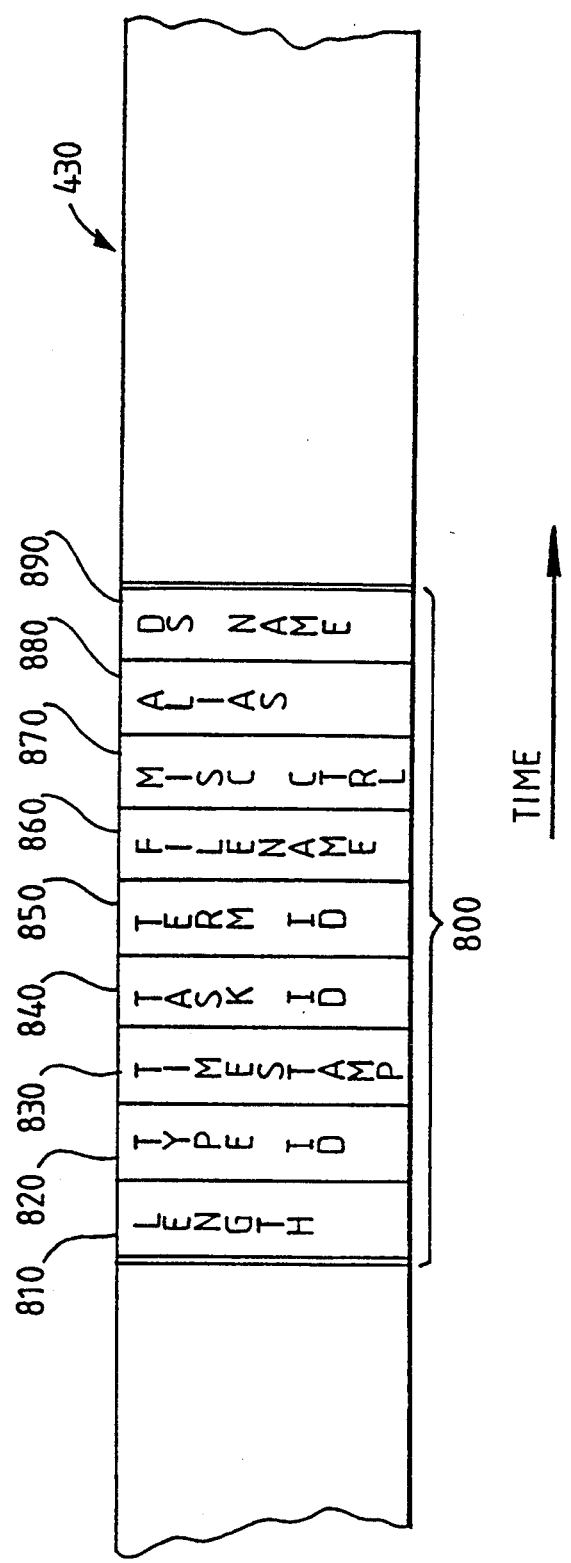
FIG. 8 shows an individual TUR.

FIG. 8 shows a single TUR 800 in more detail. In analogy with FIG. 5 above, this entry contains a number of items of information 810-890 relating to a single association between a filename and a data set. The information stored in entry 800 is as follows:

810: The length of the TUR entry, in bytes;
820: An identification that this entry relates to a TUR;
830: A timestamp, showing the system date and time at which the TUR was written to the log;
840: An identification of the task or job which caused the TUR to be written to the log;
850: The user terminal (if any) associated with the task;
860: The filename to which this TUR relates;
870: Miscellaneous control and padding bytes;
880: An intermediate alias name used to refer to the data set name;
890: The name of the data set associated with that filename.

The way in which the TUR records are used in the recovery procedure will now be described with reference to FIG. 9.

As described above, an entire set of TURs 700 is periodically written to the log. Following this processing the preferred first step performed is to determine the time 640 of the oldest first update log entry of all in-progress (uncommitted) LUWs. The position 670 on the log corresponding to time 640 cannot now be used as the recovery point, because the recovery utility would not know the associations between filenames referred to in subsequent log entries and the corresponding data sets. Therefore, the recovery point 900 is determined to be the start time of writing the last set of TURs for which writing the whole set completed before the position 670.

The recovery point 900 is written to the data set catalogue 240 for all data sets which are open for update and eligible to be backed up while open. A new recovery point is calculated and stored after each set of TURs 700 is written to the log, so the value 900 in the catalogue is always the most recently calculated recovery point. The catalogue 240 is then backed up at the same time as the data set. As above, if recovery is necessary the backup copy of the data set is reinstated, along with its catalogue 240 and the recovery point stored therein, to provide a new working copy, and all updates in the log from point 900 onwards are reapplied.

The recovery point will generally be before the time at which the backup was started. This means that when recovery is performed, updates recorded in the log and reapplied by the recovery utility might already be included in the reinstated working copy of the data set. However, this need not cause any problems. Known recovery utilities provide mechanisms for handling such duplications, which generally produce an error condition. If an error would be produced in this situation the 'BWO' flag 250 (which is recovered from the backed-up copy of the data set's catalogue 240) can be used to signal to the recovery utility that these error conditions should be ignored.

An alternative to the above periodic calculation is to calculate the recovery point at the time the backup is taken. Although this would work, it is preferable to keep the backup processing separate from the calculation of the recovery point. This is because the backup copying will probably be an operating system task (the operating system not necessarily having any knowledge of which LUWs are in progress at a particular time), whereas the calculation of the backup point will be a database or transaction manager task.

It will be clear that since additions to the log are made in chronological order, any references to storing or using the time of a particular log entry could also apply to storing or using a position or address on the log of that entry.

When a data set is opened, the recovery point 900 for that data set can safely be set to the current time at opening. This is because all updates would have completed before the data set had earlier been closed. The recovery point 900 can be written into the data set's catalogue and the BWO flag 250 can be set at this stage.

Similarly, when the last logical file associated with a data set is closed the data set itself closes. All updates are completed, and the recovery point 900, which may be recorded in the catalogue, can be set to the current time, and the BWO flag reset, at the time of closure.

We claim:

1. Data processing apparatus comprising:
   means for processing stored data as a series of logical units of work (LUWs), with updates to the stored data made during each LUW being committed at a commit point for that LUW;
   means for maintaining a log of updates made to the stored data;
   means for detecting the oldest uncommitted update made to the stored data;
   means responsive to the detecting means for calculating a recovery point;
   means for taking a backup copy of at least a portion of the stored data while that portion is available for update; and
   means for recovering the database by reinstating the backup copy to provide a working copy and applying the updates contained in any log entries made after said recovery point.

2. Data processing apparatus as claimed in claim 1, in which the means for detecting the oldest uncommitted update comprises:
   means for detecting the first log entry, corresponding to an update, made by each LUW;
   means for storing the time of that first log entry;
   means for detecting the earliest of at least a subset of the stored first log entry times; and
   means for deleting the first log entry time corresponding to a completed LUW.

3. Data processing apparatus of claim 1, in which:
   the stored data is organized as a plurality of data sets, each data set being addressable by means of one or more alias filenames.

4. Data processing apparatus as claimed in claim 3, in which:
   each data set has an associated catalogue, for storing system housekeeping data; and
   the recovery point corresponding to a data set is written to that data set's catalogue; and
   the backup copy of a data set includes a copy of the data set's catalogue at the time the backup was taken.

5. Data processing apparatus as claimed in claim 3 or claim 4, further comprising:
   means for associating with a data set a data item signifying whether that data set is eligible to be backed up while available for update.

6. Data processing apparatus of claim 3, further comprising:
   means for writing a tie-up-record (TUR) to the log when a filename is associated with a data set, the TUR defining at least the association between the filename and the data set.

7. Data processing apparatus as claimed in claim 6, further comprising:
   means for periodically writing to the log a set of TURs for at least some of the data sets.

8. Data processing apparatus as claimed in claim 7, in which:
   the set of TURs comprises those TURs corresponding to filenames associated with open data sets eligible to be backed up while open.

9. Data processing apparatus as claimed in claim 7, in which:
   the recovery point is defined as the start time of writing a previous set of TURs for which writing completed before the oldest uncommitted update was made.

10. Data processing apparatus of claim 7, in which:
    a recovery point is calculated when a set of TURs has been written to the log.

11. Data processing apparatus of claim 1, in which:
    the recovery point corresponding to a backup copy is calculated at the time that backup is taken.

12. Data processing apparatus of claim 1, in which the recovery point associated with the backup copy is equal to the start time of the oldest uncommitted updated at the time the backup copy was made.

13. A method of operation of a data processor, comprising the steps of:
    processing stored data as a series of logical units of work (LUWs), with updates to the stored data made during each LUW being committed at a commit point for that LUW;
    maintaining a log of updates made to the stored data;
    detecting the oldest uncommitted update made to the stored data;
    calculating a recovery point dependent upon the start time of the oldest uncommitted update;
    taking a backup copy of at least a portion of the stored data while that portion is available for update; and
    when necessary, recovering the database by reinstating the backup copy to provide a working copy and applying the updates contained in any log entries made after said recovery point.

14. A transaction management system having
    means for processing stored data as a series of logical units of work (LUWs), with updates to the stored data made during each LUW being committed at a commit point for that LUW;
    means for maintaining a log of updates made to the stored data;
    means for detecting the oldest uncommitted update made to the stored data;
    means responsive to the detecting means for calculating a recovery point;
    means for taking a backup copy of at least a portion of the stored data while that portion is available for update; and
    means for recovering the database by reinstating the backup to provide a working copy and applying the updates contained in any log entries made after said recovery point.

15. A transaction manager, for cooperating with a data processing apparatus, to provide means for
processing stored data as a series of logical units of work (LUWs), with updates to the stored data made during each LUW being committed at a commit point for that LUW;
maintaining a log of updates made to the stored data;
detecting the oldest uncommitted update made to the stored data;
calculating a recovery point dependent upon the start time of the oldest uncommitted update;
taking a backup copy of at least a portion of the stored data while that portion is available for update; and
when necessary, recovering the database by reinstating the backup copy and applying the updates contained in any log entries made after said recovery point.

16. Apparatus cooperable with data processing apparatus to provide means for
processing stored data as a series of logical units of work (LUWs), with updates to the stored data made during each LUW being committed at a commit point for that LUW;
maintaining a log of updates made to the stored data;
detecting the oldest uncommitted update made to the stored data;
calculating a recovery point dependent upon the start time of the oldest uncommitted update:
taking a backup copy of at least a portion of the stored data while that portion is available for update; and
when necessary, recovering tile database by reinstating the backup copy to provide a working copy and applying the updates contained in any log entries made after said recovery point.

* * * * *